Patented Feb. 20, 1940

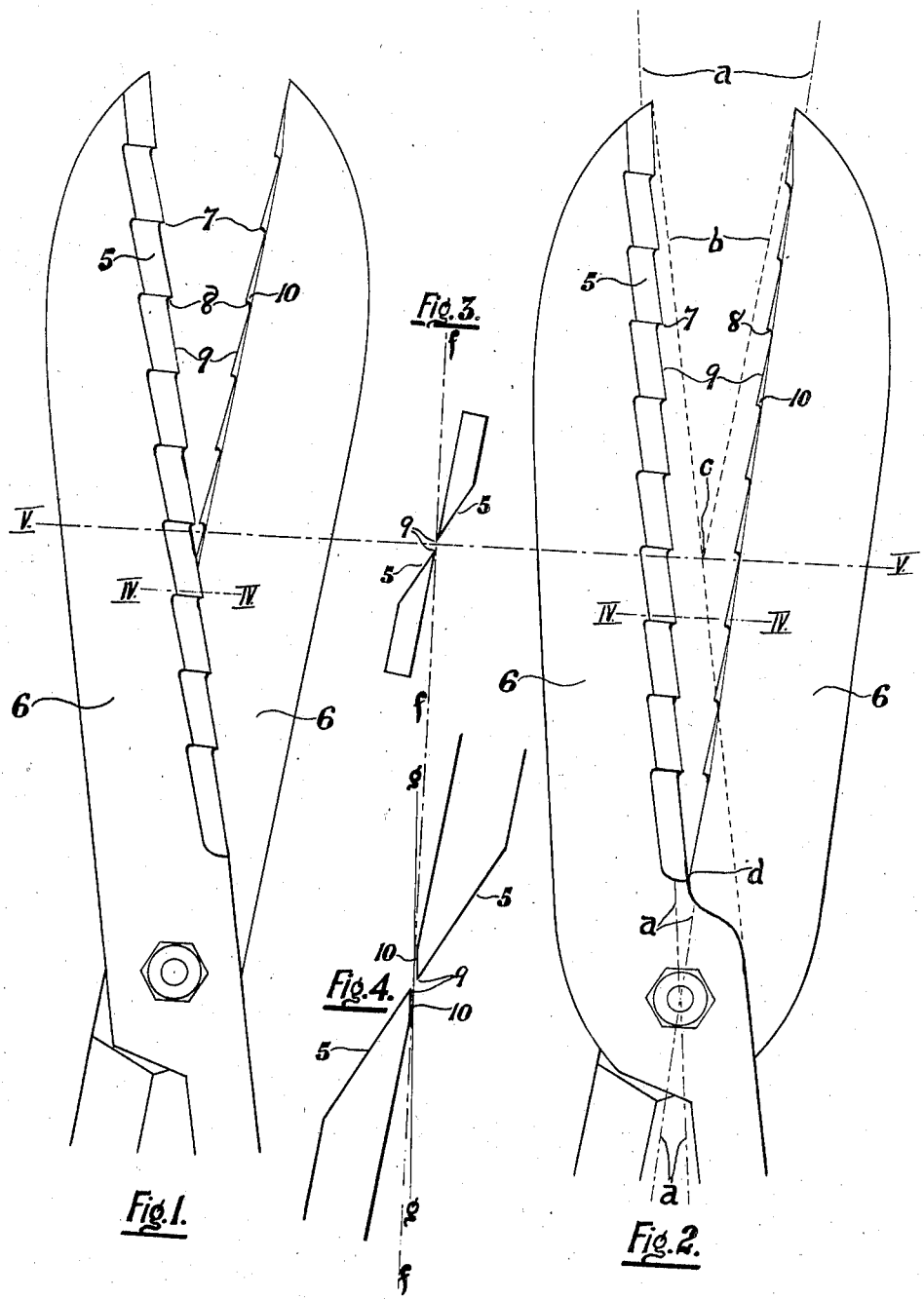

2,191,236

UNITED STATES PATENT OFFICE 2,191,236

GARDEN OR HEDGE SHEARS

William Grant McDonald, East St. Kilda, Victoria, Australia

Application June 18, 1937, Serial No. 150,600
In Great Britain February 11, 1936

2 Claims. (Cl. 30—355)

My invention relates to improvements in cutting tools, having two blades working radially on a pivot-bolt or screw. It is the general custom for the blades of such shears to have plain or straight uninterrupted working edges, but a disability attendant thereon is that when attempting to cut through various objects, such as for example comparatively tough or stout stems, twigs or other growth, the objects tend to slip or be forced forward, as the blades close on it or them, and escape from the outer ends or tips thereof without being severed. This is due in part to the fact that the cutting edges are generally ground to a shearing angle—this being the lesser of two evils. When the plain edged blades are ground to a keen cutting angle the amount of slip between the material and the blades rapidly dulls their cutting edges. With blades ground as herein described the slipping propensity is reduced to a minimum. The series of keen edged cutting wedges are like a number of wood chisels secured edge to edge, the rear portion of each one projecting a little ahead of the front portion of that next behind it. The physical property of a wedge, to drive into work in the direction which bisects its own angle, causes these blades to be forced together by the pressure of the work on the outer level of each pair of cutting wedges. The natural wear thus produced keeps the edges perfectly keen, in fact natural wear produces a keener and truer edge than is possible to obtain by grinding on the stone.

All substances to be severed in the garden are wood; wood should be cut, not sheared. The word shears, in relation to my invention, is a misnomer, as my blades are definitely cutters. They are not suitable to operate on thin paper, light fabric, or sheet metal, but on substances with some body in them such as card-board, leather, rubber, klinkerite and other packings, they are very efficient.

I am aware of many prior arts in relation to improvements in hand shears, most of which serrate one blade only. The types of notches and serrations are many, also others have treated both blades. My invention is distinct and differs from all the prior arts I have been able to learn of.

In order that this invention may be better understood, reference will now be made to the accompanying sheet of drawings, which are to be taken as part of this specification and read herewith:

Figure 1 is a face view of a pair of blades of the conventional type, with their cutting edges ground in accordance with the invention.

Figure 2 is a face view of a pair of blades designed to further increase their efficiency in the prevention of forward slip of material requiring cutting.

Figure 3 is a cross section taken on the line V—V of Figures 1 and 2.

Figure 4 is a part cross section, on a greatly enlarged scale, taken on line IV—IV of Figures 1 and 2.

Referring to the drawing it will be seen that the bevels forming the cutting edges on both blades 6 are stepped, thus forming a series of keen cutting wedges in pairs, each pair being precisely opposite one another. This stepped bevel has a continuous cutting edge, the rear portion of each wedge forms the tooth 7. The abutment edge 8 may be straight but is preferably curved as shown between 7 and 9 it should be short or shallow, nothing is gained by increasing the depth of 8; rather it would add to the difficulties of producing the facet 10 on the inner side of the cutting edges dead accurately.

Theoretically the angle of facet 10 should be, the plane of blade movement represented by the dotted line f, Figs. 3 and 4. Actually several details have a bearing on this angle 10. They are, the set of the blades both longitudinal and transverse, the flexibility of the blades and the pressure of the work being cut on the outer bevels 5 of the wedges. Fig. 4 shows this facet 10 ground to the line 9—9 which is a little in excess of the true angle, natural wear will very soon make this facet or series of facets perfect along the entire length of the blades.

Figure 2 illustrates a pair of blades having a greater degree of efficiency than the conventional type shown in Fig. 3. The advantages being, that for any degree of blade opening there is available for use, a greater amount of cutting edges and the angle between the two cutting edges is greatly decreased, thus reducing the forward thrust on the material as the blades close on it. $a$—$a$ are radius lines on the extremity of the arc of blade opening. The cutting edge of each blade is approximately parallel to $a$—$a$.

The ordinary type of blades have their cutting edges illustrated in the dotted lines $b$. The amount of cutting edges, their angles, and the difference between the amount of blade available for cutting, in each type are illustrated at $c$ and $d$, Fig. 2.

Having now particularly described and ascertained the nature of my said invention and in what manner the same is to be performed, I declare that what I claim is:

1. Improvements in and relating to garden or hedge shears and the like, wherein each blade is provided along its cutting edge with a series of straight edged cutting wedges forming shallow recesses in said edge, the blade members being turned at an angle to the plane of blade movement and each cutting portion of the blade having a beveled outer portion sloping towards the inner face of the blade member at a small acute angle, the inner wall of the blade having its cutting portion formed by a short beveled portion extending from a line slightly below the bottom of the shallow recesses in the cutting edge and substantially in the plane of blade movement and sloping at a sharp acute angle to the plane of blade movement and meeting the first said beveled portion to form a sharp cutting edge, each of the above mentioned wedges being ground to a knife edge and terminating at its forward end in a short curved cutting edge which connects it to that wedge next in front of it, so as to provide throughout the length of the series of wedges, a continuous stepped cutting edge, devoid of any shearing or noncutting portions.

2. Improvements in and relating to garden or hedge shears and the like, as claimed in claim 1, wherein both blades are provided with a series of straight edged cutting wedges and curved abutment edges, each of which is precisely opposite that of its fellow on the opposite blade, so that the abutment edges co-operate in cutting and preventing the work from slipping, and the wedges provide, with the pressure of the work on their outer bevels, an equal and even pressure on the inner edge of each blade whilst entering the work.

WILLIAM GRANT McDONALD.